(12) United States Patent
Gordon et al.

(10) Patent No.: US 6,478,148 B2
(45) Date of Patent: Nov. 12, 2002

(54) SEALED PACKAGING DEVICE FOR DISC-SHAPED ITEMS AND RELATED MATERIALS AND METHOD FOR PACKAGING SUCH DISKS MATERIAL

(76) Inventors: Alexandra Gordon, 115 The Farms Rd., Bedford, NY (US) 10506; Charles W. Grimes, 55 Allwood Rd., Darien, CT (US) 06820; William L. Plumb, 357 Piermont Ave., Piermont, NY (US) 10968

( * ) Notice: Subject to any disclaimer, the term of this patent is extended or adjusted under 35 U.S.C. 154(b) by 0 days.

(21) Appl. No.: 09/917,316

(22) Filed: Jul. 28, 2001

(65) Prior Publication Data

US 2002/0005365 A1 Jan. 17, 2002

Related U.S. Application Data

(60) Continuation-in-part of application No. 09/702,266, filed on Oct. 31, 2000, which is a division of application No. 09/161,064, filed on Sep. 25, 1998, now Pat. No. 6,216,857.

(51) Int. Cl.[7] .............................................. B65D 85/57
(52) U.S. Cl. ..................................... 206/232; 206/308.1
(58) Field of Search .......................... 53/471; 206/217, 206/232, 303, 307, 308.1, 308.3, 310; 220/521, 522, 212, 787; 215/227; 446/73

(56) References Cited

U.S. PATENT DOCUMENTS

| | | | | |
|---|---|---|---|---|
| 1,464,827 A | * | 8/1923 | Morrison | 206/309 |
| 1,940,088 A | * | 12/1933 | Harrison | 206/309 |
| 2,020,381 A | * | 11/1935 | Labowitz et al. | 206/309 |
| 3,530,981 A | * | 9/1970 | Wienecke, Jr. | 206/310 |
| 4,197,940 A | * | 4/1980 | DeRossett | 220/787 |
| 4,535,888 A | * | 8/1985 | Nusselder | 206/308.1 |
| 4,869,891 A | * | 9/1989 | Bray | 206/232 |
| 5,284,243 A | * | 2/1994 | Gelardi et al. | 206/308.1 |
| 5,542,531 A | * | 8/1996 | Yeung | 206/308.1 |
| 5,697,498 A | * | 12/1997 | Weisburn et al. | 206/308.1 |
| 5,769,218 A | * | 6/1998 | Derraugh et al. | 206/308.1 |
| 5,816,394 A | * | 10/1998 | O'Brien et al. | 206/308.1 |
| 5,819,929 A | * | 10/1998 | Chen | 206/308.1 |
| 5,855,273 A | * | 1/1999 | Grobecker et al. | 206/310 |
| 6,070,752 A | * | 6/2000 | Nava et al. | 206/217 |
| 6,112,891 A | * | 9/2000 | Wohl et al. | 206/232 |
| 6,196,411 B1 | * | 3/2001 | Nava et al. | 220/521 |

\* cited by examiner

Primary Examiner—Jim Foster
(74) Attorney, Agent, or Firm—Grimes & Battersby, LLP

(57) ABSTRACT

A packaging device is provided for packaging at least one disc-shaped item such as, for example, a recording media disc such as a CD, a CD-ROM or a DVD. The packaging device includes an opening at one end thereof, and it has at least one internal upper chamber and at least one internal lower chamber for respectively receiving the disc-shaped item and the other materials. These chambers are divided by a support element that is adapted to positively retain the disc-shaped item within the upper chamber. A lid is further provided for closing the opening at the end of the packaging device. A method is further provided for packaging such disc-shaped item and other material within the packaging device.

31 Claims, 13 Drawing Sheets

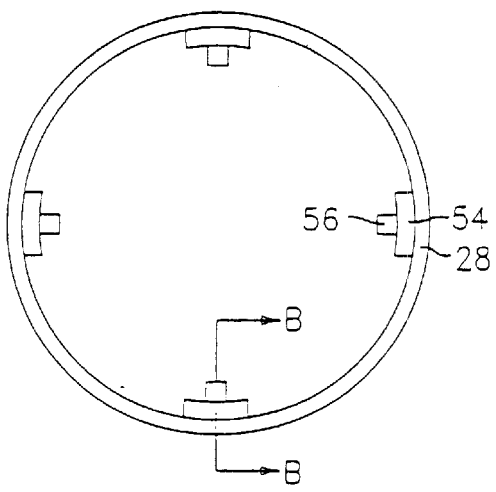
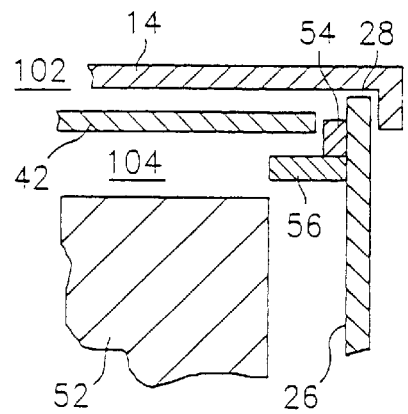
FIG. 3　　　　　　　　FIG. 3A
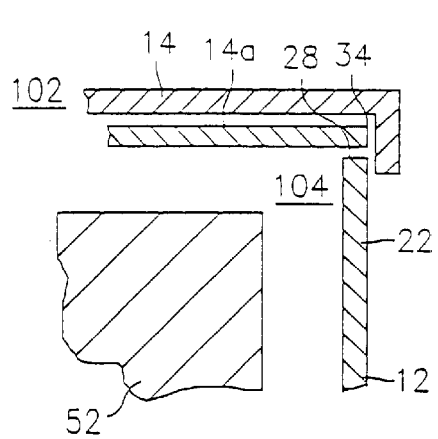
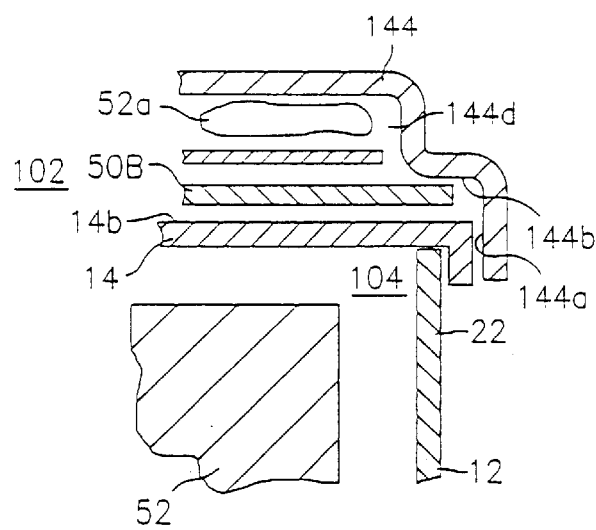
FIG. 3B　　　　　　　　FIG. 3C

SEALED PACKAGING DEVICE FOR DISC-SHAPED ITEMS AND RELATED MATERIALS AND METHOD FOR PACKAGING SUCH DISKS MATERIAL

RELATED APPLICATIONS

This is a continuation-in-part of co-pending U.S. Pat. application Ser. No. 09/702,266 filed on Oct. 31, 2000 in the names of Alexandra Gordon and Charles W. Grimes for "Packaging Device for Disc-Shaped Items and Related Materials and Method for Packaging Such Disks and Material", pending, which, in turn, was a divisional of U.S. Pat. application Ser. No. 09/161,064 filed on Sep. 25, 1998 in the names of Alexandra Gordon and Charles W. Grimes for "Packaging Device for Disc-Shaped Items and Related Materials and Method for Packaging Such Disks and Material", U.S. Pat. No. 6,216,857.

BACKGROUND OF THE INVENTION

1. Field of the Invention

This invention relates, in general, to a device for packaging and displaying a circular or disc-shaped media and other materials and a method for packaging such disc-shaped media and other materials and, in particular to containers and methods for initially packaging and thereafter repeatedly storing disc-shaped media together with or without other materials.

Still more particularly, the present invention further relates to a new and improved method for initially packaging and thereafter repeated storing of a disc-shaped media including a support element to receive and retain said disc-shaped media and further including a protective element to protect the media surface of said disc-shaped media.

2. Background of the Invention

Packaging and storage devices for media are generally known. Disc-shaped media, such as CD's, DVD's or CD-ROM's, encounter special problems in handling, packaging and storage due to their delicate, flat recorded surfaces. Such disc media is generally sold in plastic cases which are sometimes referred to as "jewel boxes." Such cases are generally rectangular and have a mounting hub for holding the disc media by its center aperture. Such cases are usually kept after purchase of the disc media and utilized for re-packaging, of the disc media between usage. Such jewel boxes are impractical packaging containers for shipping because of their small dimensions and easy breakage, and they thus require substantial additional packaging material or placement in larger shipping containers.

Disc media is routinely sold with other materials (whether directly related to the content of the disc media, i.e., ancillary, or otherwise). At the present time, disc media in such "jewel boxes" is commonly packaged together with ancillary materials in larger rectangular shaped cardboard boxes for shipping, sale and packaging. The "jewel boxes" are necessary to reliably protect the disc media from contact with the ancillary materials in the larger cardboard boxes. Such plastic case/cardboard box combination package arrangements are not only expensive, they also do not lend themselves to easy and secure repeated re-storage of the disc media and ancillary materials. They are often damaged during initial opening and repeated re-storage. They are often unable after initial opening to securely re-store the disc media (in the jewel box) and the other materials together in the cardboard packaging in a manner to preclude contact with each other. They frequently become unsightly after initial opening and repeated re-storage. They are, themselves, difficult to handle and store.

Other types of packaging and storage devices are needed to organize, protect, ship, display at retail and store disc media sold and/or shipped in combination with ancillary materials.

A need also exists for devices which can effectively and efficiently organize, protect, ship, display at retail and store disc shaped media with other materials.

An opportunity exists that is not being commercially exploited at the present time to distribute disc-shaped recording media with materials that are either ancillary or wholly unrelated to the content of the disc media. This opportunity is not being exploited due to the lack of an effective container design and method for efficiently organizing, protecting, shipping, displaying at retail and storing disc-shaped media packaged with other materials.

SUMMARY OF THE INVENTION

One important object of this invention is to provide a container in which and a method whereby disc-shaped media and ancillary materials can initially be packaged together in stacked relationship and, after removal and use, they can easily be re-stored in stacked relationship in a manner so as to avoid contact there between.

Another object of this invention is to provide a container and a method of packaging that eliminates the need for a separate case (i.e., the need for a "jewel box") for the disc media.

Another object of this invention is to provide a container and a method of packaging whereby during initial storage, shipping, retail presentation and re-packaging disc media is securely held against movement and protected.

Another important object of this invention is to provide a shipping container in which and a method of shipping whereby disc-shaped media and other materials can be packaged, presented, conveyed, distributed and stored.

Another important object of this invention is to provide an aesthetically unique and compelling device and method for presenting at retail disc-shaped media and other materials which may or may not be related to the content of the media.

Another object of this invention is to provide a container and a method of packaging whereby the internal wall of the first chamber of the container is cylindrical in shape and of a diameter slightly larger than the external diameter of the disc media to thus retain the disc media in the container against movement in the plane of the disc media.

Another object of this invention is to provide a container and a method of packaging whereby either an annular ring or protrusions mounted on the internal wall of the first chamber define an opening slightly larger in internal diameter than the external diameter of the disc media into which the disc media can be inserted to thus retain the disc media in the container against movement in the plane of the disc media.

Another object of this invention is to provide a container and a method of packaging, whereby the container has a removal cover that attaches to the container when the disc media is either initially positioned or subsequently re-stored on the seat and that retains the disc media against movement in a second, opposite direction perpendicular to the plane of the disc media.

Another object with this invention is to provide a container and a method packaging whereby the seat and lid are removable and the seat and lid can be combined to create a permanent storage and restoring package for the disc media alone.

Another object of this invention is to provide a container and a method of packaging whereby an annular ring or protrusions mounted on the internal wall of the first chamber define an annular post slightly smaller in exterior diameter than the diameter of the center hole of the disc media to thus retain the disc media on the post in the container against movement in the plane of the disc media.

Another object of this invention is to provide a container and a method of packaging whereby a protective insert is placed in the container before the disc media to protect the disc media from contact with the other materials.

Another object of this invention is to provide a container and a method of packaging whereby a replaceable protective insert is placed in the container before the disc media to protect the disc media from contact with the other materials, which insert can be removed to access the ancillary materials and can be replaced after the ancillary materials are re-stored in the container and before the disc media is re-stored in the container.

Another object of this invention is to provide a container and method of packaging whereby the first chamber is within the removable lid and the disc media support member is a center post fixedly attached to and extending from the inside center of the lid.

To accomplish these and other objects, the container of this invention in its preferred form comprises a first member for the storage of disc-shaped media in a chamber or cavity, which container may be attached to any storage device used for the storage of materials other than the disc-shaped media. The chamber includes means for maintaining the disc media in a stable state within the chamber, including a structure defining support for the disc media whether by means of the annular opening at the center thereof or the perimeter thereof, such that the disc media is allowed to rotate, while limiting the linear movement of the disc media both perpendicular to and parallel to the plane of the media. The disc-shaped media is sealed within the inner chamber by means of either a circular protective element or by means of a complementary lower second member adapted to engage the first member. The protective element may be affixed by a variety of means, including heat-sealing to either the inner structure or perimeter of the first member, or both, or snapping engagement onto the first member by means of at least one protrusion on either the inner structure or perimeter of the first member, or both. Other attachment means, such as adhesives, or sealing compression fits, are contemplated. The container may be attached to the storage device by a variety of means, including seating the container on top of the storage device and sealing it thereon, attaching it by means of a compression fit, or including a skirt along the perimeter of the container, which skirt is adapted to slide under and be retained by a raised lip rim of the storage device.

In the preferred method of packaging, disc media is inserted into and releasably retained within the chamber of the storage device by means of a cylindrical inner structure and sealed therein by means of a protective element.

The above, as well as additional objects, features and advantages of the invention will become apparent in the following detailed description.

BRIEF DESCRIPTION OF THE DRAWINGS

The novel features believed characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings, wherein:

FIG. 3 is a top plan view of the novel disc packaging device of the present invention illustrating the alternative use of abutments and protrusions affixed to the inside wall of the container;

FIG. 3A is a cut-away, cross-sectional side view of a portion of the device shown in FIG. 3, along line B—B, with a disc media and other materials inserted and the lid affixed;

FIG. 3B is a cut-away, cross-sectional side view of an alternative embodiment of the novel disc packaging device of the present invention illustrating the alternative use of the upstanding rim of the base and the inside wall of the cover in place of the abutments and protrusions of FIG. 3;

FIG. 3C is a cut-away, cross-sectional side view of an alternative embodiment of the novel disc packaging device of the present invention illustrating the alternative use of the outer surface of the cover and the inner surface of a supplementary cover in place of the abutments and protrusions of FIG. 3;

DETAILED DESCRIPTION OF THE INVENTION

Figure 1:
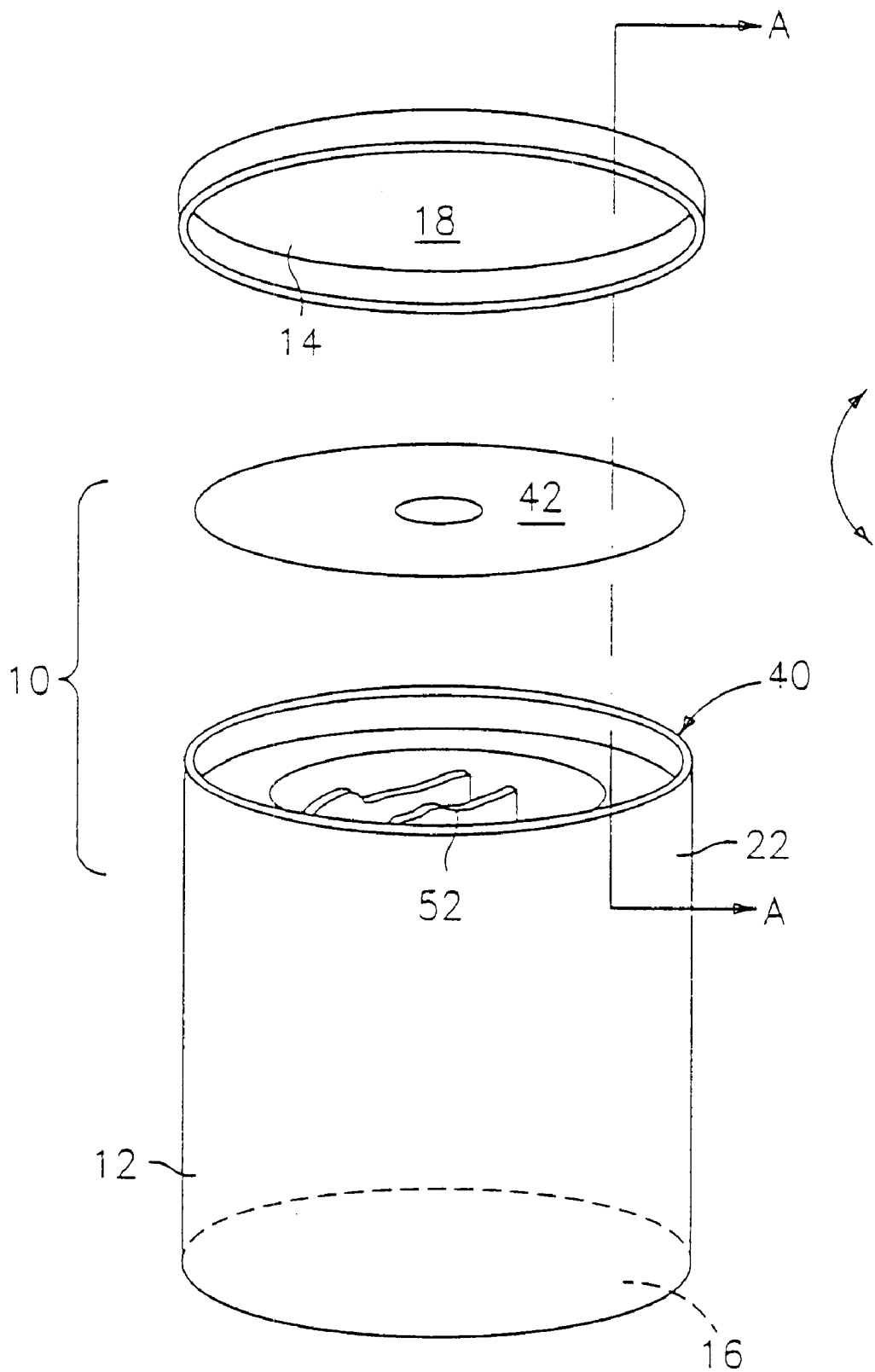
FIG. 1 is an exploded perspective view of the novel disc packaging device of the present invention with the lid and disk media removed, illustrating the use of a one-piece annular collar member with an annular ring and lip.

With reference now to the figures and in particular with reference to FIG. 1, there is shown a front view of the disc packaging device 10 of the present invention. As illustrated, disc packaging device 10 includes a lower base component or container 12 and an upper cover component or lid 14. Lower base component 12 and upper cover component 14 are utilized to form a generally cylindrical packaging device of dimension slightly larger than the disc shaped recording media to be stored. End plates 16 and 18 cooperate with lower base component 12 and upper cover component 14 to fully enclose the cylindrical packaging space defined thereby.

Figure 2:
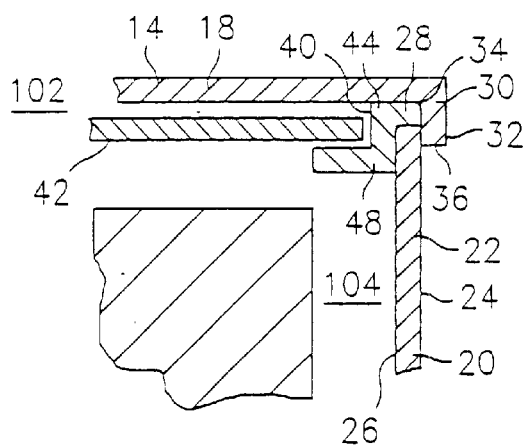
FIG. 2 is a cut-away, cross-sectional side view of a portion of the novel disc packaging device of FIG. 1 when the lid is on the container, along line AA illustrating the resultant first and second chambers thereof.

The lower base component 12 of the embodiment of this invention shown in FIGS. 1 and 2 includes a side wall 20. The side wall can be constructed from either cardboard (i.e., natural fiber material) or plastic (i.e., man-made synthetic material) or other material suitably rigid for the base component to retain its shape, including metal, e.g., as in a vacuum sealed, canned product.

The base component 12 can be designed to threadably receive the bottom plate 16 which is of conventional design, made of stiff cardboard, plastic, metal or some similarly rigid material and used as a cover-all screw cap on a very wide variety of containers. Alternatively the bottom plate 16 can nest inside the side wall 20 where it is held by friction, stapling, gluing or some other means. The side wall 20 has an upper section 22 and the upper section 22 can be threaded to accommodate the upper cover component 14 although in the embodiment shown in FIGS. 1 and 2 the cover is made of plastic and snaps on in a conventional manner.

As best seen in FIG. 2, the upper section 22 is defined by an outer wall 24, an inner wall 26 and a rim 28. The cover component 14 has a side wall 30 defined by an outer wall 32, an inner wall 34 and a rim 36. The diameter of the inner wall 34 of the cover component is slightly greater than the diameter of the outer wall 24 of the base component. In the embodiment shown in FIGS. 1 and 2, there is an inner structure 40 which provides circumferential support for a disc shaped media 42 stored within the packaging device 10. The structure 40 comprises an annular collar 44 having an annular ring 46 and an annular lip 48. The inner structure 40 nests within the lower base component 12. The annular collar 44 has an outer diameter greater than the diameter of the inner wall 26 of the base component such that the annular collar extends beyond the inner wall 26 and sits on top of the base rim 28. The annular ring 46 has an outer diameter less than the diameter of the inner wall 26, such that the annular ring nests inside the inner wall 26. The annular lip 48 has an inner diameter less than the outer diameter of the disc shaped media 42. Thus, the disc shaped media will rest on the annular lip, inside the annular ring. In this way, movement of the disc shaped media in the plane of the disc shaped media is precluded by the annular abutment 46. Movement of the disc shaped media perpendicular to its plane is prevented in one direction by the annular lip 48. When the cover component 14 is affixed to the base component 12, the cover plate 18 acts to preclude movement of the disc shaped media in the opposite perpendicular direction to the plane of the disc shaped media.

Figure 2A:
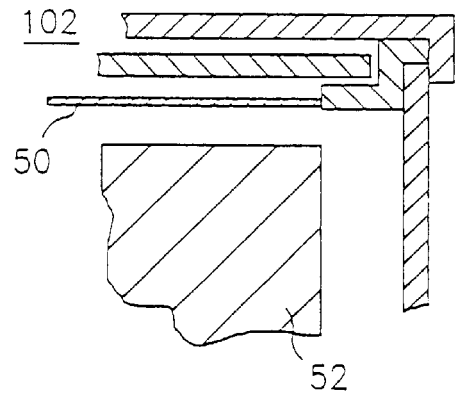
FIG. 2A is an alternative embodiment of the device shown in FIG. 2, wherein a protective element is inserted between the first and second chambers.

In the embodiment disclosed in FIG. 2A, a protective member 50 is attached to the annular lip 48. The protective member can be made of plastic film or any other conventional material to provide a barrier between the disc shaped media and other materials 52 which can be stored in the base component 12 of the packaging device 10. The protective member can be permanently affixed to the annular lip or it can be affixed at the time of assembly and shipment and removed by the consumer after purchase, i.e., at a time when further "rough handling" that would cause interaction between the disc shaped media and the other materials is less likely to occur.

Figure 2B:
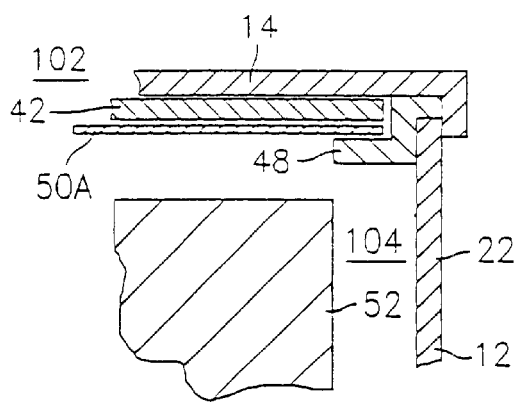
FIG. 2B is an alternative embodiment of the device shown in FIG. 2A, showing an alternative method of insertion of the protective element between the first and second chambers.

In an alternative embodiment disclosed in FIG. 2B, the protective element is removable and sized to seat on the annular lip 48 between the annular lip 48 and the disc shaped media. The protective element is round like the disc shaped media and has a central opening into which one's finger can be inserted to engage, lift and remove the protective element and subsequently engage, lift and replace the protective element.

Figure 2C:
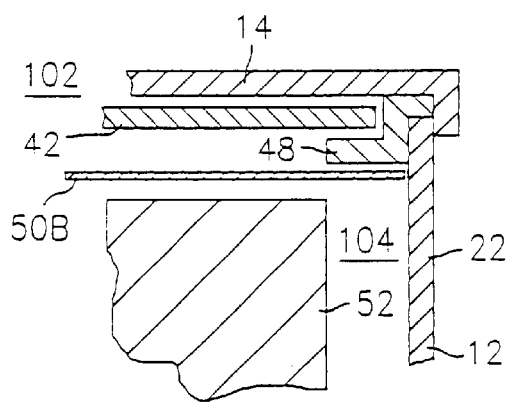
FIG. 2C is a further alternative embodiment of the device shown in FIG. 2A, showing, a further alternative method of insertion of the protective element between the first and second chambers.

In an alternative embodiment disclosed in FIG. 2C, the protective element 50B is flexible and is removably inserted within the lower base component beneath the annular lip 48 and on top of the other materials 52 placed therein. The protective element is sized to correspond to the interior wall 26 and has a central opening into which one's finger can be inserted to engage, lift and remove the protective element and subsequently engage, lift and replace the protective element. Alternatively, the protective element can be provided with a lift tab or some other conventional means whereby it can be grabbed and removed.

In the alternative embodiment shown in FIGS. 3 and 3A, the inner structure 40 is modified. The annular collar 44 with annular ring 46 and annular lip 48 is replaced. by discrete abutments 54 and discrete protrusions 56. Collectively, the abutments 54 and protrusions 56 are positioned within the lower base component 12 around the circumference of the inner wall 26 spaced below the rim 28, affixed to the inner wall 26, so as to perform the same function as the annular ring 46 and annular lip 48. Specifically, the abutments 54 preclude movement of the disc shaped media in the plane of the disc shaped media i.e., performing the same function as the annular ring 46. Similarly, the protrusions 56 are positioned about the inner wall 26 and collectively preclude movement of the disc shaped media in a direction perpendicular to plane of the disc shaped media i.e., performing the same function as the annular lip 48.

FIG. 3B shows a further alternative embodiment wherein the disc shaped media is seated on the rim 28 and movement of the disc shaped media perpendicular to its plane is prevented in one direction by the rim 28. When the cover 14 is affixed to the base component 12, movement of the disc shaped media in the plane of the disc shaped media is precluded by the inner wall 34 of the cover 14 and inner surface 14a of the cover 14 acts to preclude movement of the disc shaped media in the second, opposite perpendicular direction to the plane of the disc shaped media.

FIG. 3C shows a further alternative embodiment wherein the disc shaped media is seated on the outside surface 14b of the cover 14 and movement of the disc shaped media perpendicular to its plane is prevented in one direction by a supplementary cover 144 that snaps onto the cover 14. When the supplementary cover 144 is affixed to the cover 14, movement of the disc shaped media in the plane of the disc shaped media is precluded by the inner wall 144a of the supplementary cover 144 and the inner wall 144b of the supplementary cover 144 acts to preclude movement of the disc shaped media in the second, opposite perpendicular direction to the plane of the disc shaped media. The supplementary cover 144 can include a chamber 144d and a protective element 50b can be inserted to prevent contact between the disc shaped media and whatever materials 52a are placed in the chamber 144d.

Figure 4:
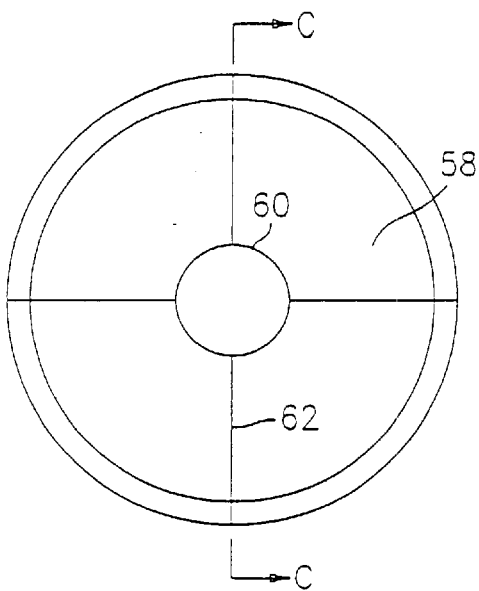
FIG. 4 is a top plan view of the novel disc packaging device of the present invention illustrating the alternative use of a center annular post support for the disc media suspended from spokes.
Figure 4A:
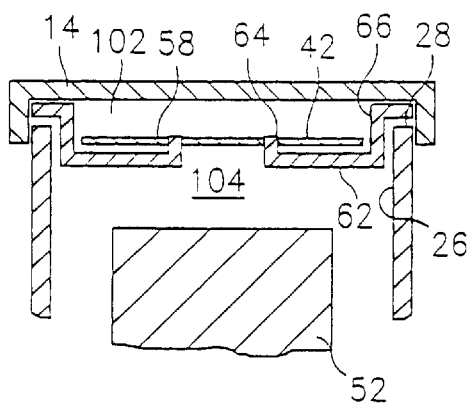
FIG. 4A is a cut-away, cross-sectional side view of the device shown in FIG, 4, along line C—C, with a disc media and other materials inserted and the lid affixed.

In the alternative embodiment seen in FIGS. 4 and 4A, the inner support structure 40 is replaced with an inner support structure 58 that provides center support for the disc shaped media as opposed to the circumferential support provided by inner structure 40. In the embodiment shown in FIGS. 4 and 4A, the alternative inner structure 58 includes an annular ring 60 and spokes 62 extending therefrom. As seen in FIG. 4A, the annular ring 60 has a raised portion 64 on which the disc media 42 sits, The spokes 62 each have a finger portion 66 which extends upwardly and outwardly such that when the structure 58 is inserted into the base component 12, the fingers 56 frictionally engage the inner wall 26 and sit on the upper rim 28. The structure 58 can include webbing between the fencers 56 (ala the webbing in a duck's foot) comprised of a thin material to provide protection for the disc shaped media 42 from the other materials 52. Inside the annular ring 60 would be left open to allow the consumer, after removing, the cover 14, to insert their finger into the annular ring and to thereby remove both the disc shaped media 42 and the structure 58.

Figure 5:
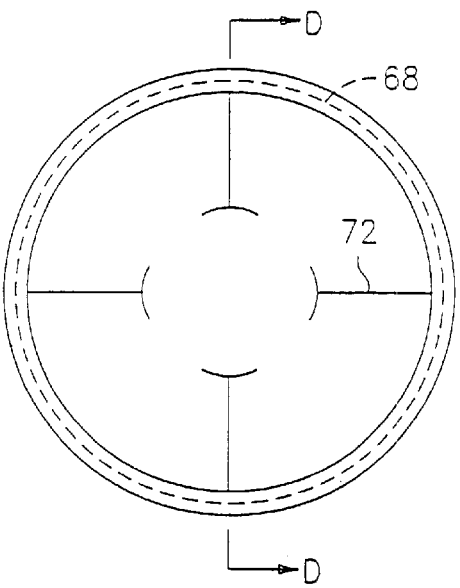
FIG. 5 is a top plan view of the novel disc packaging device of the present invention illustrating fingers that extend from a frame carried by the side wall of the container and that provide center support for the disc media.
Figure 5A:
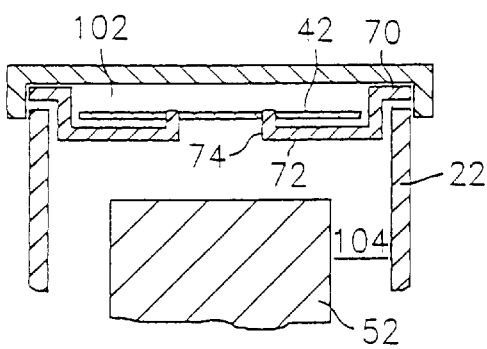
FIG. 5A is a cut-away, cross-sectional side view of the device shown in FIG. 5, alone, line D—D, with a disc media and other materials inserted and the lid affixed.

FIGS. 5 and 5A show a further alternative inner structure 68 comprising an annular collar 70 from which fingers 72 extend inwardly. At the ends of the fingers 72 are upstanding projections 74. The annular collar 70 nests inside the inner wall 26 and sits on the rim 28 in the same manner as the inner structure 40 in the embodiment shown in FIGS. 1 and 2. The upstanding projections 74 cooperate to provide a center support structure for the disc shaped media.

Figure 6A:
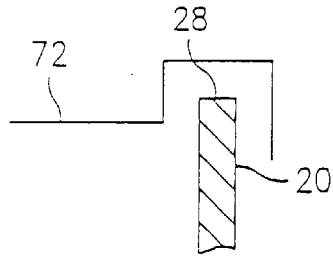
FIG. 6A and 6B are cross-sectional views of alternate embodiments of the packaging device of the present invention depicting two different methods of mounting the disc media support member to the device outer wall.
Figure 6B:
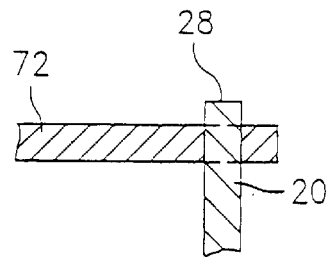

As seen in FIGS. 6A and 6B, the fingers 72 in the embodiment shown in FIGS. 5 and 5A do not necessarily need to be suspended from an annular collar. Alternatively, the could be clipped to the side wall 20 as seen in FIG. 6A or they could be screwed into the side wall 20 as shown in FIG. 6B.

Figure 7:
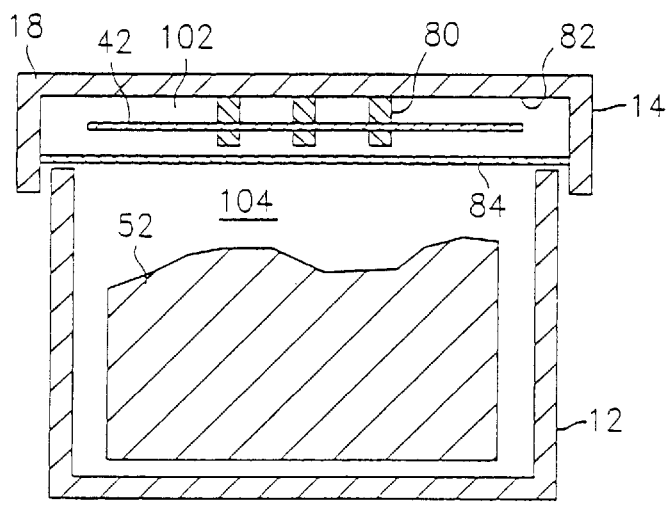
FIG. 7 is a cut-away, cross-sectional side view of an alternative embodiment of the present invention with disc media and other materials inserted, the protective element inserted and the lid closed, in which the first chamber in which the disc media is stored is in the cover.

In an alternative embodiment shown in FIG. 7, a center support structure is provided for the disc shaped media in the upper cover component 14. Specifically, projections 80 extend from the inside wall 82 of the end plate 18. These projections 80 cooperate to provide secure support for the disc shaped media in the cover component 14. A protective element 84 can be provided which is either removably nested within the cover as shown or which can be inserted at the time of manufacture and removed and discarded by the consumer after purchase. The cover 14 can engage the base component 12 in any variety Of conventional ways, e.g., snap on, telescope on, screw on, etc.

Figure 7A:
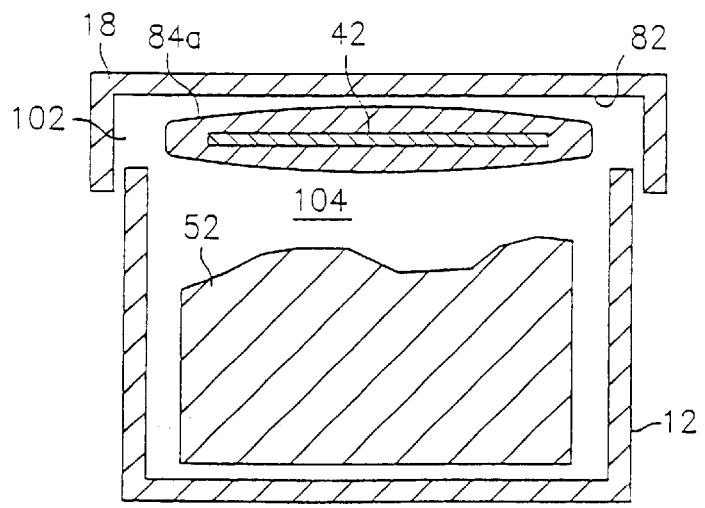
FIG. 7A is a cut-away, cross-sectional side view of an alternative embodiment of the device shown in FIG. 7, wherein the disc media is inserted into a protective envelope that is affixed to the inner surface of the cover.

In a further alternative embodiment shown in FIG. 7A, the disc shaped media is encased within an envelope 84a made of plastic or some other suitable material and which is affixed to the inside wall 82 of the end plate 18. The envelope is either removably or permanently affixed, e.g., by gluing, with double-sided tape, or by other conventional means. The envelope can itself constitute a re-useable packaging container for the disc shaped media that either remains affixed to the plate 18 or can be removed from the plate 18, e.g., so that the cover 14 can be discarded. Or the disc shaped media can be packaged within a packaging sleeve (not shown) ail of which can then be inserted into the envelope and then removed from the envelope once the envelope is opened.

Figure 8:
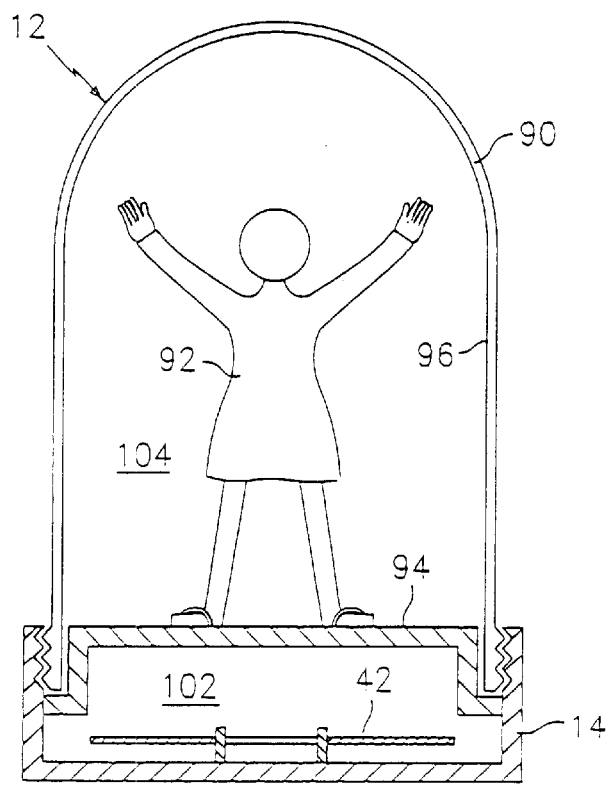
FIGS. 8 and 8A are side perspective, partially cut-away, cross-sectional views of alternative embodiments of the present invention, illustrating the use of the "lid" of the embodiment shown in FIG. 7 as the base, thereby allowing the portion of the invention defining the second chamber to be of an irregular shape (FIG. 8) or to have deformable construction (FIG. 8A)
Figure 8A:
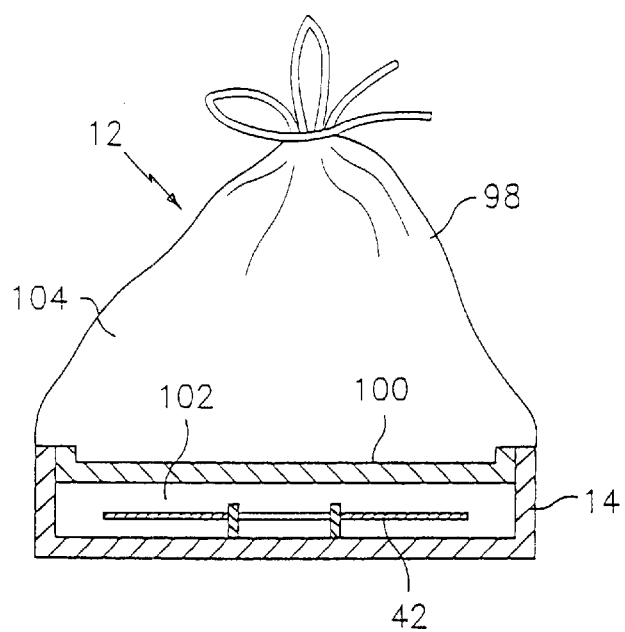

FIGS. 8 and 8A show further alternative embodiments of the present invention. In FIG. 8, the fact that the disc shaped media is stored within the cover component 14 allows for an alternative construction of the container 12. In this alternative embodiment, the cover 14 serves as the "base". The alternative base 90, in which the other materials, in this case, a doll 92, are stored, has an end wall structure 94 which frictionally encases the inner wall 96 and seals the chamber in the base 90. Alternatively, wall 94 can be provided with threads so that it will threadably engage corresponding threads on the inside wall 96. The cover 14 and base 90 can be attached in the same manner as heretofore been discussed in connection with other embodiments.

In the embodiment showing in FIG. 8A, the cover 14 once again carries the disc shaped media 42 and thereby allows the base 12 to be of a deformable construction 98. The deformable member 98 has a rigid internal support structure 100 which is designed to frictionally or threadably engage the cover 14.

Figure 9:
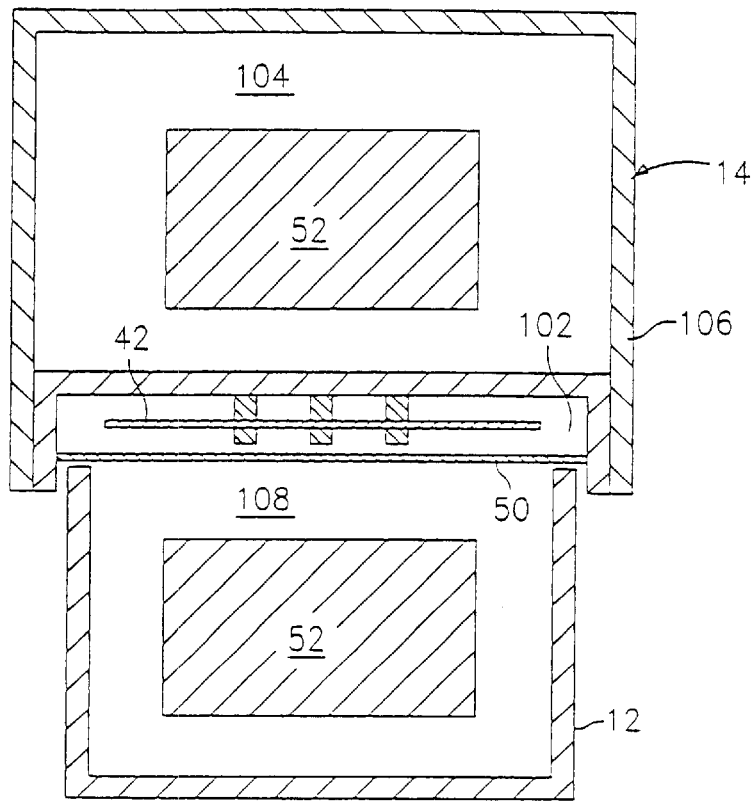
FIG. 9 is a cut-away, cross-sectional side view of an alternative embodiment of the present invention in which the disk media is located in the lid and the lid and the container include second and third chambers, respectively, for storing other material.
Figure 10:
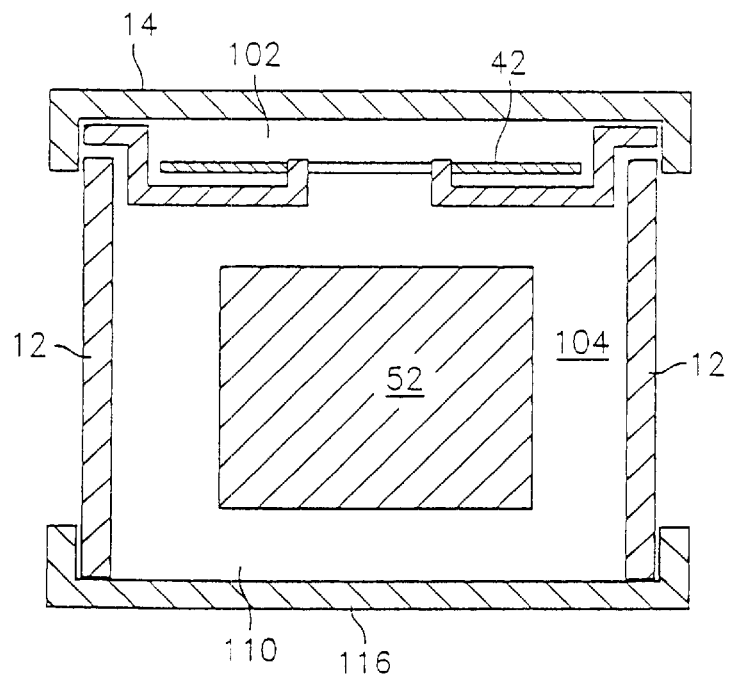
FIG. 10 is a cut-away, cross-sectional view of another embodiment of the present invention in which the second chamber in the container for storing other materials includes a second opening separate and distinct from the lid and a removable cover such that access to the second chamber can be attained without removing the lid.

In the alternate embodiment shown In FIG. 9, the disc shaped media is stored in a first chamber 102 in the lid 14 defined by an annular support 40 similar in construction to the embodiment of FIG. 7, except that the lid includes a second chamber 104 defined by an outer wall 106 for other materials and the base 12 includes a third chamber 108. In the alternate embodiment shown in FIG. 10, which is similar in construction to the embodiment of FIG. 4, there is provided an additional opening 110 in the container 22 and a cover 116 for closing the opening 110. The cover 116 can be removed to gain access to the chamber 104 without removing the cover 14.

Figure 11:
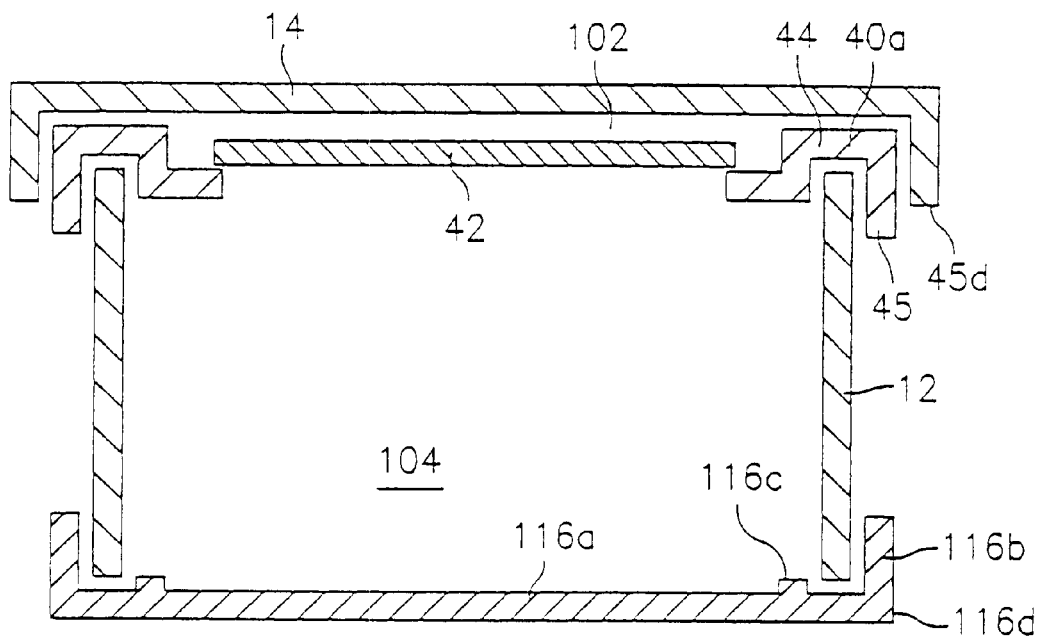
FIGS. 11 and 11A are cut-away, cross-sectional side views of another embodiment of the device shown in FIG. 10 in which the method of mounting shown in FIG. 6A is utilized and wherein the removable cover for the second chamber can be mated with the removable cover for the first chamber to form a mini-packaging device shown in FIG. 11A.
Figure 11A:
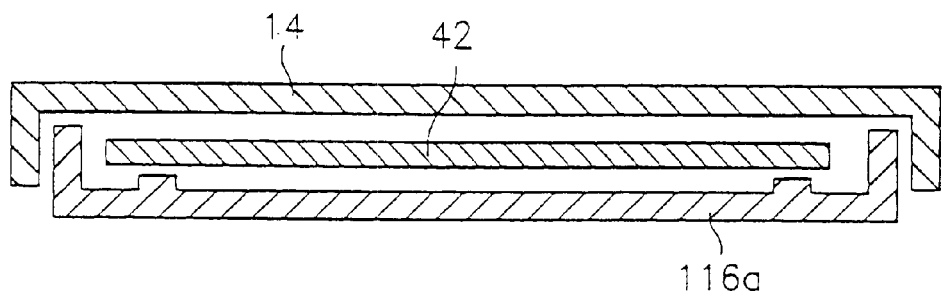

In the alternative embodiment shown in FIGS. 11 and 11A, an inner structure 40a is provided that is a slightly modified version of the inner structure 40 shown in FIG. 2, in that it includes an annular wall 45 that extends around the entire circumference of the annular collar 44 and engages the outer surface of the wall of the base 12, and the cover 14 is configured to engage not the base 12, but rather, the annular wall 45. An additional opening 110 is provided as in the embodiment of FIG. 10, and a cover 116a is provided that is a slightly modified version of the cover 116 of FIG. 10, in that it includes not only an outer annular wall 116b for engaging the outer surface of the wall of the base 12, but also an inner annular wall 116c for engaging the inner surface of the wall of the base 12. The circumferential dimension of the outer surface 116d of the wall 116b of the cover 116a is identical to the circumferential dimension of the outer surface 45d of the wall 45, such that the covers 14 and 116a can be removed and the cover 14 which matingly engaged the wall 45 will matingly engage the outer wall 116b of the cover 116a, as shown in FIG. 11A. In this way, as also shown in FIG. 11A, the covers 14 and 116a can be used together as a mini-packaging device for the disc shaped media 42. In the embodiment shown, the inner wall 116c helps to securely retain the disc shaped media against movement. However, it is understood that the benefits of the invention could be achieved without such inner wall, or utilizing one of the other retaining methods disclosed herein.

Figure 12:
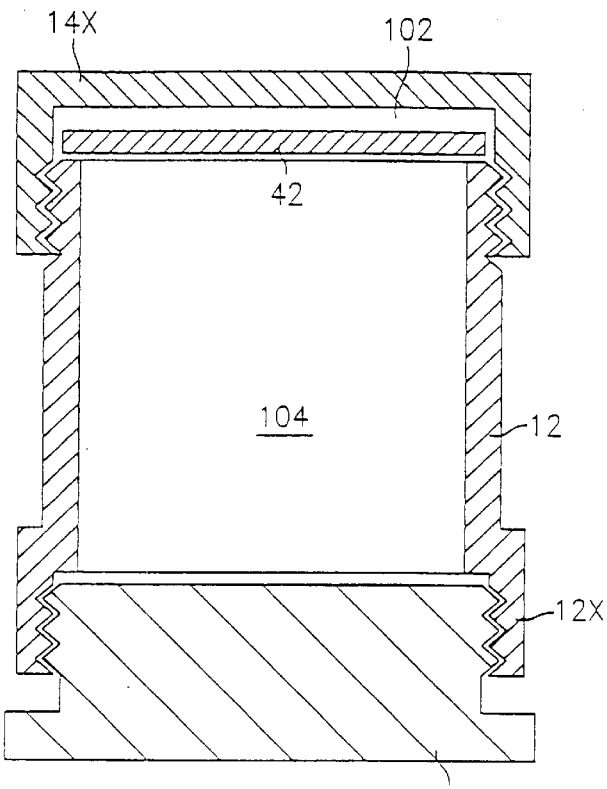
FIG. 12 is a cut-away, cross-sectional side view of an alternative embodiment of the device shown in FIGS. 11 and 11A in which the method shown in FIG. 3B for retaining the disc media is utilized and in which the two covers threadably engage the base and, when removed, can be threaded together to create a mini-packaging unit.

In the alternative embodiment shown in FIG. 12, the disc shaped media seats on the rim 28 as in the embodiment shown in FIG. 3B, but the cover 14x does not snap onto the base 12, but rather, threadably engages it. Furthermore, the bottom 12x of the base 12 is flared outwardly and contains internal threads that are of the same dimension as the internal threads of the cover 14x. The cover 116x includes mating external threads such that the cover 116x can be threaded into the flared bottom 12x of base 12. In this way, the covers 14x and 116x can be removed from the base 12 and threadably engaged to form a mini-packaging unit for the disc shaped media.

Figure 12A:
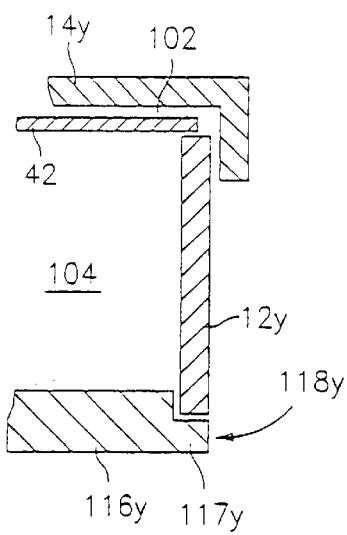
FIG. 12A and 12B are cut-away, cross-sectional side views of alternative embodiments of the device shown in FIG. 12, wherein the two covers slidably engage after removal (FIG. 12A) or threadably engage after removal (FIG. 12B)
Figure 12B:
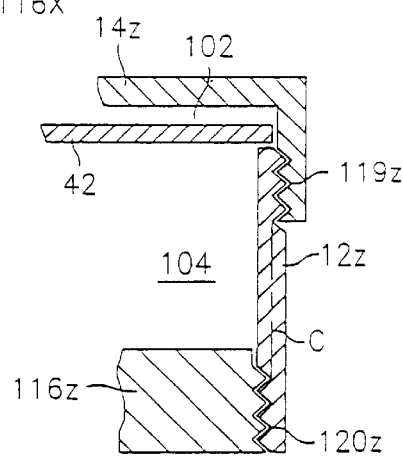

In the alternative embodiments of FIGS. 12A and 12B, the need to flare out the bottom of the base 12 is eliminated. In FIG. 12A, the base 12y receives a bottom cover 116y that includes an overlapping portion 117y, the outer surface 118y of which is of equal dimension to the outer surface 118y of which is of equal dimension to the outer wall of the base 12y, such that covers 14y and 11y can be slidably engaged to form a mini-storage unit for the disc media. In FIG. 12B, the base 12z has an external threaded portion 119z and an internal threaded portion 120z each of which extends beyond the center line "C" of the wall of the base 12z. In this way, when the covers 14z and 116z are removed, they can be threadably engaged to form a mini-storage unit for the disc media.

Figure 13:
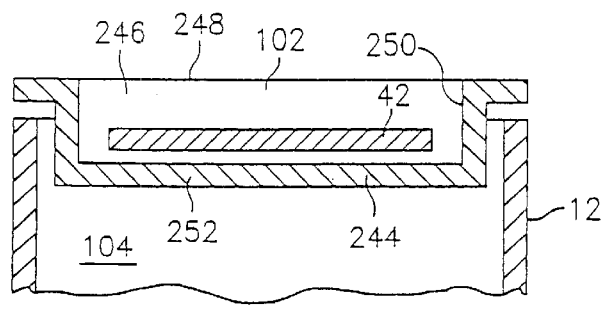
FIG. 13 is a cut-away, cross-sectional side view of another embodiment of the present invention in which a concave cavity on the exterior side of the cover for the device forms the first chamber for the disc media and a seal encloses the disc media within the concave cavity.

FIG. 13 shows a further alternative embodiment, wherein the cover 244 nestingly seats within the base 12 and the disc shaped media 42 is placed within the concave recess 246 of the cover 244. A seal 248 made of plastic or other suitable material is applied to the cover 244 to hold the disc shaped media within the cover 244 until the seal is removed by the user. The disc shaped media can be retained against movement within the cover 244 as a result of contact with the side walls 250, bottom wall 252 and seal 248, or by utilization of any of the other methods taught herein.

Figure 14:
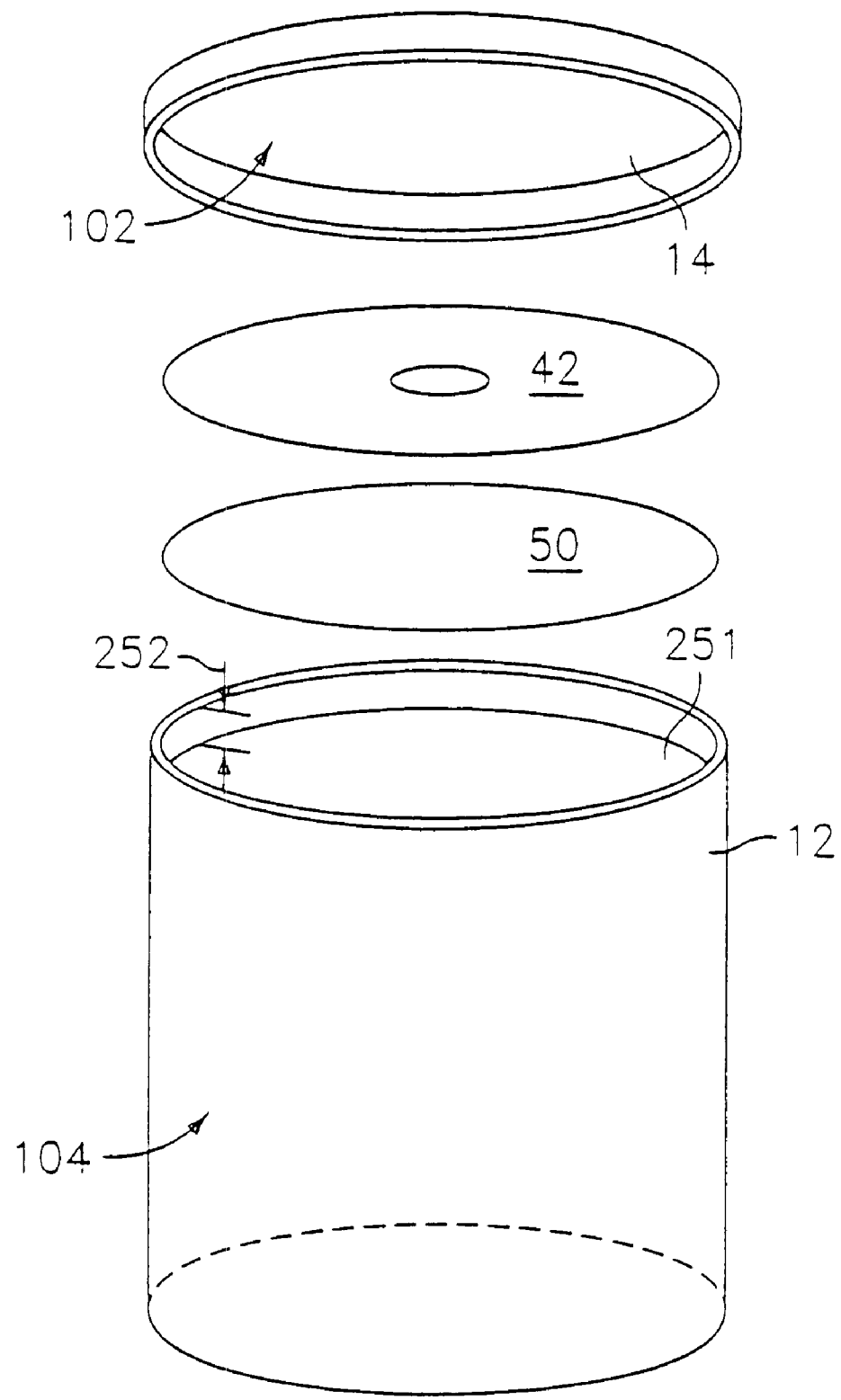
FIG. 14 is an exploded perspective view of a further alternative embodiment of the novel disc packaging device of the present invention with the lid, disk media and protective element removed, illustrating the use of a sealed base.

FIG. 14 shows a further alternative embodiment wherein the base 12 is a separately manufactured container of miscellaneous content, that includes a slightly concave end 251, the depth 252 of which exceeds the combined thickness of a disc shaped media 42 and a protective element 50 which are seated within the concave end 251 and held there by cover 14 which snaps onto base 12. In an alternate embodiment, a protective element is not used or the disc shaped media is packaged in an envelope (not shown).

Figure 15:
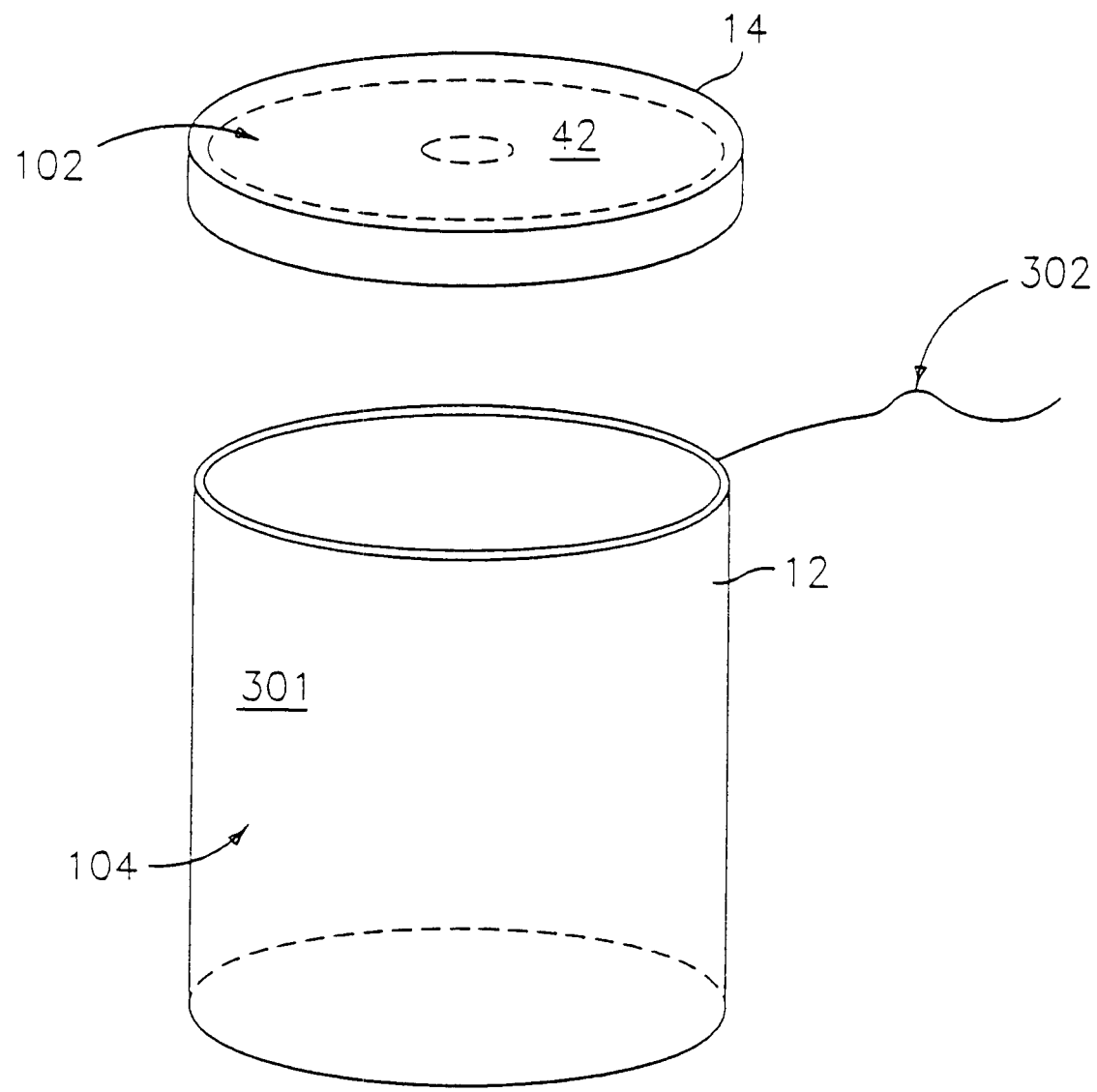
FIG. 15 is an exploded perspective view of a further alternative embodiment of the novel disc packaging device of the present invention in which the disk media is sealed within the lid, and the base is separately sealed, and the lid and base are detachably joined together by an outer packaging skin that can be severed with a pull string.

FIG. 15 shows a further alternative embodiment wherein the disc shaped media is mounted and sealed within cover 14, e.g., as taught herein in connection with other embodiments, and cover 14 is attached to base 12 by paper packaging material skin 0 1 that binds the cover 14 and base .12 together. Cover 14 is separated from base 12 by pulling string 302 which tears the skin 301 and brakes the circumferential attachment between cover 14 and base 12.

It would be understood that in each embodiment, a container device is provided in which disc shaped media can be packaged, distributed, displayed at retail and, if desired, restored with other materials and that, in effecting such usage, discrete chambers are provided for the disc media and for the other materials so as to prevent contact between the disc media and the other materials. In the embodiments shown in FIGS. 1 through 6B, the inner structure, whether it is the annular collar of FIG. 1, or the discretely positioned abutment/protrusion clips of FIG. 3, or the upstanding rim in FIG. 3B, or the lid and supplemental lid of FIG. 3C, or the "spider" structure of FIG. 4, or the "trap" structure of FIG. 5, in each case is located in and helps define a first chamber in the lower base component 12. Underneath this first chamber is a second chamber. The first chamber receives and securely holds, despite repeated removal and re-packaging, the disc shaped media. The second chamber receives the other materials and keeps these materials separate from the disc shaped media. The need for a separate "jewel case" for the disc shaped media is thus completely eliminated.

It would be understood that the shape of the container can be varied without departing from the scope of the present invention, e.g., the cylindrical base 12 can be square or rectangular so long as the outer wall of the collar 40 corresponds and the collar includes spacers from the outer wall of the collar to the annular ring and annular lip of the present invention. Similar adjustments could be made to the other embodiments as would be apparent to those skilled in the an having reviewed this disclosure. The abutment/protrusions clips of FIG. 3 could be mounted on a non-cylindrical shaped base, as could the spider structure of FIG. 4 or the trap structure of FIG. 5.

It would be understood by those skilled in the art that the function of the annular ring of FIG. 1 or the abutments of FIG. 2 could be performed by an appropriately dimensioned inner wall 26 of the container 12.

It would be further understood that while several methods of attaching the annular collar of FIG. 1, the abutment/protrusion clips of FIG. 2, the spider structure of FIG. 3 and the trap structure of FIG. 4 have been shown, those skilled in the alt after having reviewed this disclosure could devise other means of attachment without departing from the scope of the present invention.

It would be further understood by those skilled in the art that the device and method of this invention can accommodate one or more disc shaped media, e.g., through the insertion of protective elements therebetween.

Illustrated in FIGS. 16A–20 are additional embodiments of the present invention comprising a first member or member 500 adapted to receive the disc-shaped media 42, and thereafter to be affixed to the cover of a container (not shown), which container may be of any size, but preferably having a circular or round top or cover. Provided at the center of the member 500 is a cylindrical projection 502 which serves the purpose of maintaining the disc shaped media 42 in a stable state within the cavity 504 formed by the member 500, by receiving and retaining the disc-shaped media 42 such that the disc-shaped media 42 is prevented from moving linearly parallel to the plane of the disc-shaped media 42, while allowing the disc-shaped media 42 to rotate around the cylindrical projection 502. Toward that end, the outer diameter of the cylindrical projection 502 must be slightly less than the diameter of the annular aperture in the disc-shaped media 42 such that the disc-shaped media 42 may be in frictional contact with the annular aperture in the disc-shaped media 42.

The disc-shaped media 42 may also be further supported within the member 500 against lineal movement perpendicular to the plane of the disc media by means of an annular shoulder element 505 encircling the cylindrical projection 502 which separates the disc-shaped media 42 from the inner surface 506 of the member 500. The height of annular shoulder element 505 should be such that it limits contact between the disc-shaped media 42 and the inner surface 506 of member 500. However, inasmuch as the surface of the disc-shaped media 42 that would come into contact with the upper inner surface 506 often is not the media surface, said annular shoulder element 505 is not an essential element of the present invention.

A separate annular protective element 508 may be provided to protect the bottom surface of the disc-shaped media 42 from contact with foreign objects. Said protective element 508 is adapted to affix to the member 500 such that it seals off an interior area or chamber 510 of the member 500 wherein the disc-shaped media is retained. In the embodiment illustrated in FIGS. 16A–16C, the protective element 508 is composed of a rigid or semi-rigid material having some flexibility thereto, such as paperboard or plastic. The protective element 508 in such embodiment is intended to snap into the member 500 so as to seal off the chamber 510 thereby protecting the disc-shaped media 42 stored therein. The protective element 508 also serves to prevent the disc-shaped media 42 from sliding out of the chamber 510. In order to gain access to the disc-shaped media 42, the protective element 508 may be then flexed slightly and snapped out of the member 500.

Figure 16A:
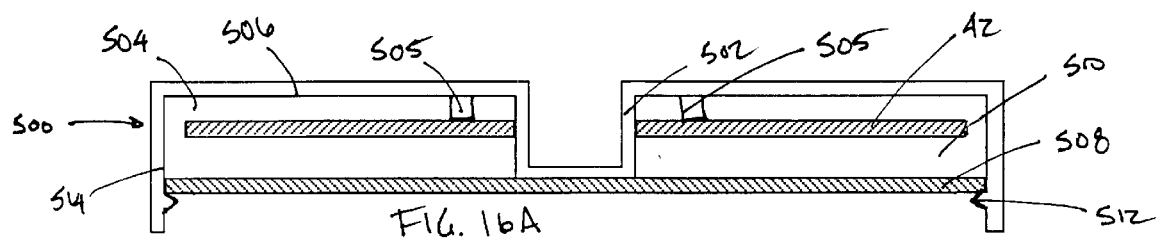
FIG. 16A is a cut-away, cross-sectional view of a further alternative embodiment of the novel disc packaging device of the present invention in which a flexible seal is provided, which seal is snapped into the device by means of at least one projection or protrusion provided in the internal rim.
Figure 16B:
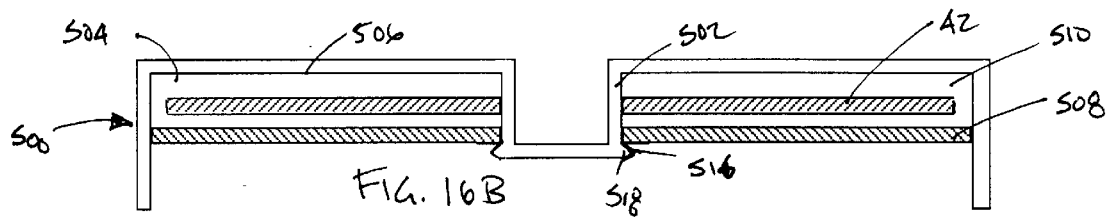
FIG. 16B is a cut-away, cross-sectional view of a further alternative embodiment of the novel disc packaging device of the present invention in which a flexible seal is provided, which seal is snapped into the device by means of at least one projection or protrusion provided in the internal cylindrical support element.
Figure 16C:
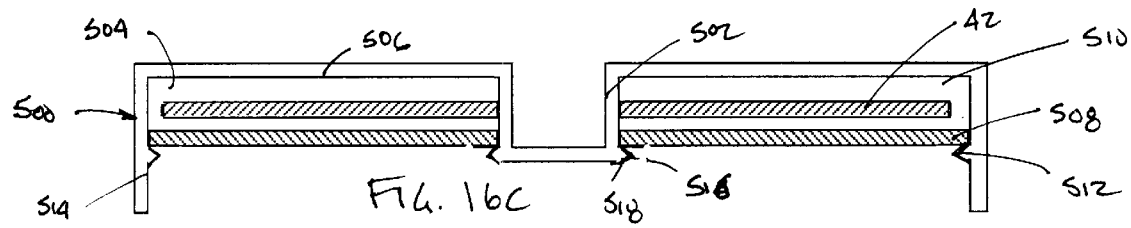
FIG. 16C is a cut-away, cross-sectional view of a further alternative embodiment of the novel disc packaging device of the present invention in which a flexible seal is provided, which seal is snapped into the device by means of at least one projection or protrusion provided in both the internal rim and the internal cylindrical support element.

FIGS. 16A–16C illustrate three alternate means for affixing the protective element 508. In FIG. 16A, the protective element 508 is intended to be received and retained by at least one wall protrusion 512 extending from the interior wall 514 of the member 500. Said wall protrusion 512 may comprise a plurality of discrete projections extending from the interior wall 514, or alternatively, a limited number of longer shelf-type projections. Alternatively, the protective element 508 could include a centrally-located, circular aperture 516 through which the cylindrical projection 502 may be inserted, as shown in FIG. 16B. In such embodiment, the protective element 508 is intended to be received and retained by at least one center support protrusion 518 extending from the top of the cylindrical projection 502. The center support protrusions 518 may comprise a plurality of discrete projections extending from the cylindrical projection 502, or alternatively, a limited number of longer shelf-type projections. A combination of both attachment means is shown in FIG. 16C, which embodiment includes both the center support protrusions 518 as well as the wall protrusions 512.

In the embodiment illustrated in FIGS. 16A–16C (as well as the embodiments of FIGS. 17A–17C and FIG. 19), the size of the protective element 508 is substantially the same as the opening to the chamber 510 such that when the protective element is mounted onto the member 500, whether the cylindrical projection 502 is inserted through the aperture 516 or not, a seal is created, preventing any substance from entering the chamber 510 and potentially damaging the disc-shaped media 42.

It should be appreciated that there are a variety of means available for attaching or affixing the protective element 508 to the member 500. In the embodiment illustrated in FIGS. 17A–17C, the protective element 508 is composed of a foil or plastic material that may be heat sealed to the member 500 in order to seal the disc-shaped media 42 within the chamber 510. As with the embodiment shown in FIGS. 16A–16C, this seal may either be heat sealed to the member 500 along the protective element's periphery 520, its center 522, or both. In each of these alternatives, however, it should be appreciated that the size of the protective element 508 should be at least as large in size as the opening to the chamber 510 in the member 500. If the foil protective element 508 in such embodiment is made larger than the opening, the excess material may be used to grasp the protective element 508 in order to break the seal between the protective element 508 and the member 500. Alternatively, a pull tab 524 of the type normally found in heat sealed containers (such as yogurt containers and the like) may be used to remove the protective element 508.

It should be understood that, for reasons such as cost, and in certain applications where closing chamber 510 is not necessary, element 508 can be reduced in size, e.g., so that it is slightly larger than the aperture of the disc-shaped media 42 and thus will "hold" the disc on projection 402 irrespective of whether the smaller element 508 is snapped under the protrusion 518 or adhered to the protrusion 528. Alternatively, the interior wall 514 may include an indentation or slot adapted to receive the sealing member 508 so as to secure said member within the chamber 510. In the preferred embodiment, the thickness of said slot is slightly larger than the thickness of the sealing member 508 so as to prevent the sealing member from "rattling" around therein. In such embodiment, the sealing member should include a tab or alternatively a notched indentation or "finger pull" so as to facilitate removal of the sealing member 508.

Figure 17A:
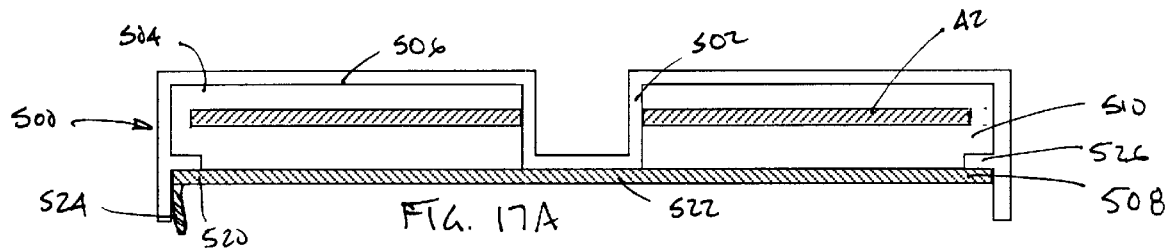
FIG. 17A is a cut-away, cross-sectional view of a further alternative embodiment of the novel disc packaging device of the present invention in which a seal is provided, which seal is affixed to at least one projection or protrusion provided in the internal rim of the device by means of heat sealing or other adhesive attachment means.
Figure 17B:
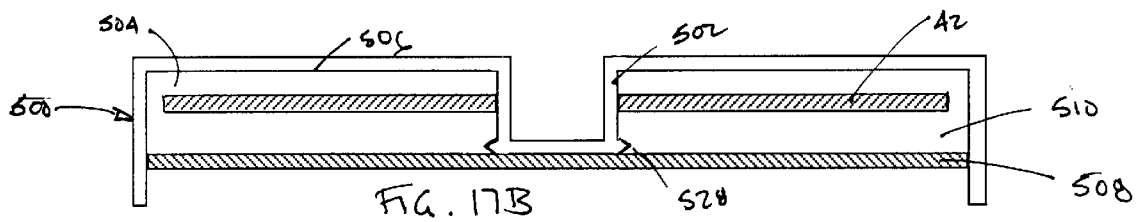
FIG. 17B is a cut-away, cross-sectional view of a further alternative embodiment of the novel disc packaging device of the present invention in which a seal is provided, which seal is affixed to at least one projection or protrusion provided in the internal cylindrical support element of the device by means of heat sealing or other adhesive attachment means.
Figure 17C:
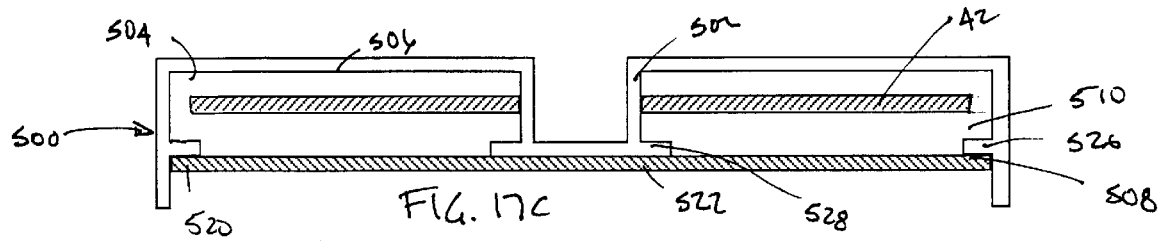
FIG. 17C is a cut-away, cross-sectional view of a further alternative embodiment of the novel disc packaging device of the present invention in which a seal is provided, which seal is affixed to at least one projection or protrusion provided in both the internal rim and the internal cylindrical support element of the device by means of heat sealing or other adhesive attachment means.

As shown in FIG. 17A, the foil protective element 508 may be heat sealed or otherwise adhered (such as by means of an adhesive) to a substantially planar annular shelf 526 that runs around the internal periphery of the member 500, which shelf extends from the interior wall 514 of the member 500. Alternatively, the protective element 508 may be heat sealed or adhered to a central platform 528 situated at the end of the circular projection 502, which platform 528 provides a substantially planar surface upon which the protective element 508 may sit. Such embodiment is shown in FIG. 17B. A combination of both attachment means is illustrated in FIG. 17C.

Figure 18:
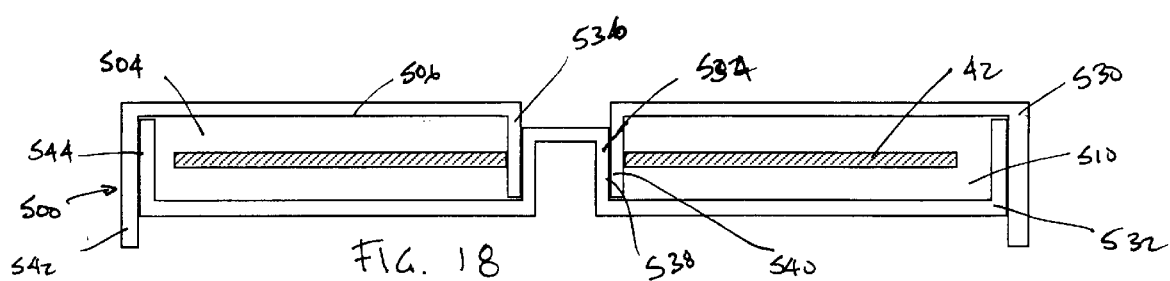
FIG. 18 is a cut-away, cross-sectional view of a further alternative embodiment of the novel disc packaging device of the present invention in which two separate complementary elements are affixed to each other by means of a compression fit.
Figure 20:
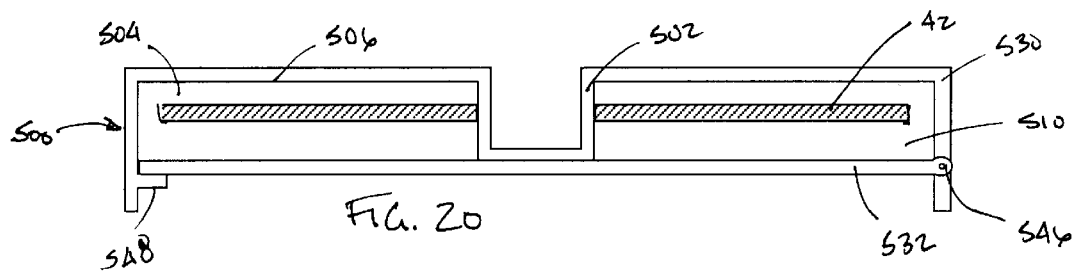
FIG. 20 is a cut-away, cross-sectional view of a further alternative embodiment of the novel disc packaging device of the present invention including a hinged element adapted to seal and protect the disc-shaped media within the device.

FIGS. 18 and 20 illustrate the use of two complementary members to create the secure chamber 510 rather than using the protective element 508. FIG. 18 demonstrates the use of an upper member 530 and a complementary lower member 532 that nest within each other to create the chamber 510 for storage of the disc-shaped media 42. The upper and lower members 530, 532 remain attached to each other by means of frictional contact between the lower internal wall 534 which extends from the interior surface of the lower member 532 and the corresponding upper internal wall 536 which extends from the interior surface of the upper member 530. In the preferred embodiment, the lower internal wall 534 is inserted into the upper internal wall 536 such that the exterior surface 538 of the lower internal wall 534 of the lower member 532 is in frictional contact with the interior surface 540 of the upper internal wall 536 of the upper member 530. Such frictional contact serves to preclude foreign objects from penetrating into the chamber 510 from the center of the member 500.

The upper and lower members 530, 532 also include interacting external walls 542, 544 which also come in frictional contact with each other when the lower member 532 is attached to the upper member 530. This serves to preclude foreign objects from penetrating the chamber 510 from the edges of the member 500. Moreover, such frictional contact between the lower internal wall 534 and the upper internal wall 536, in addition to the frictional contact between the upper external wall 542 and the lower external wall 544, serves to create a substantially airtight chamber 510 within which the disc-shaped media may be stored.

Alternatively, the complementary elements may be attached by means of a hinge 546 as shown in FIG. 20. In such embodiment, either the upper member 530 or the lower member 532 may be formed with the cylindrical projection 502 for receiving and retaining the disc-shaped media. The opposing members 530, 532 are attached to each other by the hinge 546, which hinge allows the two members to open and close as a clam-shell type container. In the embodiment shown in FIG. 20, the lower member 532 is sized so as to fit within the upper member 530, and be retained in the closed position by means of engagement with at least one projection 548.

Regardless of the embodiment of the member 500, whether it is a clamshell as shown in FIG. 20, or two interlocking members as shown in FIG. 18, or whether it has a rigid protective element 508 that is snapped into place as shown in FIGS. 16A–16C, or has a heat or adhesive sealed protective element 508 as shown in FIGS. 17A–17C, a variety of means for attaching the member 500 to another object, such as a container, exist. For example, the member 500 may be attached directly to the other object by means of an adhesive, snaps, straps, hook and loop fasteners or other similar attachment means. Alternatively, the member 500 may be attached by means of heat sealed plastic or blister packaging.

Figure 19:
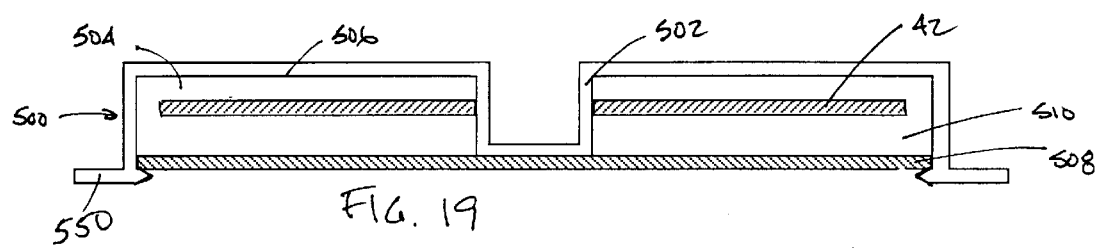
FIG. 19 is a cut-away, cross-sectional view of a further alternative embodiment of the novel disc packaging device of the present invention including a skirt extending from the base of said device.

The size of the member 500 and the container to which it is attached is irrelevant. If the member 500 is larger than the container, the container may be attached directly to the bottom of the member 500. If the member 500 is smaller than the container, a skirt 550 may be included on the external surface of the member 500 as illustrated in FIG. 19, which skirt 550 serves to extend the effective size of the member 500. Said skirt 550 may also be utilized to snap under a conventional projecting lip or rim on the container, such that the member 500 may be removably attached to the container solely by means of the interaction between the skirt 550 and the container lip.

Having thus described the invention with particular reference to the preferred forms thereof, it will be obvious that various changes and modifications can be made therein without departing from the spirit and scope of the present invention as defined by the appended claims.

Wherefore we claim:

1. A packaging device comprising:
    a container including a cavity having an opening therein for receiving at least one disc-shaped media having an aperture therethrough, said container including means for retaining said disc-shaped media against movement within said cavity while simultaneously allowing said disc-shaped media to rotate freely;
    means for sealing said cavity; and
    means for attaching said container to a storage device for storage of materials other than said disc-shaped media.

2. The device of claim 1, wherein said container includes an internal upper surface and an internal lower surface, and further including a support structure extending from said internal upper surface, wherein said structure is adapted to be inserted through said aperture so as to support and positively receive and retain said disc-shaped media while simultaneously allowing said disc-shaped media to rotate freely.

3. The device of claim 2, wherein said means for sealing comprises a substantially rigid sealing member.

4. The device of claim 3, wherein said sealing member includes an opening therein corresponding to said support structure and said support structure includes at least one flexible projection disposed at the end thereof, wherein said flexible projection is adapted to receive and retain said sealing member.

5. The device of claim 4, wherein said flexible projection is an annular ring.

6. The device of claim 4, wherein said flexible projection is at least one tab.

7. The device of claim 4, wherein said container further includes an inside wall defining said cavity situated adjacent to said opening, wherein said inside will includes an indented track running the length thereof, wherein said track is also adapted to receive said sealing member.

8. The device of claim 3, wherein said container includes at least one flexible protrusion disposed about said opening, wherein said flexible protrusion is adapted to receive and retain said sealing member.

9. The device of claim 8, wherein said flexible projection is an annular ring.

10. The device of claim 8, wherein said flexible projection is at least one tab.

11. The device of claim 3, wherein said sealing member includes an opening therein corresponding to said support structure, said container includes at least one flexible protrusion disposed about said opening, and said support structure includes at least one flexible projection disposed at the end thereof, wherein said flexible projection and flexible protrusion are adapted to receive and retain said sealing member.

12. The device of claim 11, wherein both said projection and said protrusion are annular rings.

13. The device of claim 11, wherein each of said projection and said protrusion are at least one tab.

14. The device of claim 2, wherein said means for sealing comprises a flexible sealing member.

15. The device of claim 14, wherein said container includes at least one protrusion about said opening, and said sealing member is removably attached to said protrusion by means of a heat seal.

16. The device of claim 15, wherein said at least one protrusion is an annular ring.

17. The device of claim 15, wherein said at least one protrusion is at least one tab.

18. The device of claim 14, wherein said container includes at least one protrusion about said opening, and said sealing member is removably attached to said rim by means of an adhesive.

19. The device of claim 18, wherein said at least one protrusion is an annular ring.

20. The device of claim 18, wherein said at least one protrusion is at least one tab.

21. A packaging device comprising:
a container including a cavity having an opening therein for receiving at least one disc-shaped media having an aperture therethrough, said container including means retaining said disc-shaped media against movement within said cavity, wherein said container includes an external surface and an internal surface, and further including a support structure extending from said internal surface, wherein said structure is adapted to be inserted through said aperture so as to support and positively receive and retain said disc-shaped media, wherein said support structure includes a substantially planar end, and wherein said sealing member is removably attached to said at least one protrusion and said end by means of a heat seal;

means for sealing said cavity, wherein said means for sealing comprises a flexible sealing member; and means for attaching said container to a storage device for storage of materials other than said disc-shaped media.

22. A packaging device comprising:
a container including a cavity having an opening therein for receiving at least one disc-shaped media having an aperture therethrough, said container including means retaining said disc-shaped media against movement within said cavity, wherein said container includes an external surface and an internal surface, and further including a support structure extending from said internal surface, wherein said structure is adapted to be inserted through said aperture so as to support and positively receive and retain said disc-shaped media, wherein said support structure includes a substantially planar end, and wherein said sealing member is removably attached to said at least one protrusion and said end by means of an adhesive;

means for sealing said cavity, wherein said means for sealing comprises a flexible sealing member; and means for attaching said container to a storage device for storage of materials other than said disc-shaped media.

23. A packaging device comprising:
a container including a cavity having an opening therein for receiving at least one disc-shaped media having an aperture therethrough, said container including means retaining said disc-shaped media against movement within said cavity, wherein said container includes an external surface and an internal surface, and further including a support structure extending from said internal surface, wherein said structure is adapted to be inserted through said aperture so as to support and positively receive and retain said disc-shaped media, wherein said support structure includes a substantially flat end, and said sealing member is removably attached to said end by means of a heat seal;

means for sealing said cavity, wherein said means for sealing comprises a flexible sealing member; and means for attaching said container to a storage device for storage of materials other than said disc-shaped media.

24. A packaging device comprising:
a container including a cavity having an opening therein for receiving at least one disc-shaped media having an aperture therethrough, said container including means retaining said disc-shaped media against movement within said cavity, wherein said container includes an external surface an an internal surface, and further including a support structure extending from said internal surface, wherein said structure is adapted to be inserted through said aperture so as to support and positively receive and retain said disc-shaped media, wherein said support structure includes a substantially flat end, and said sealing member is removably attached to said end by means of an adhesive;

means for sealing said cavity, wherein said means for sealing comprises a flexible sealing member; and means for attaching said container to a storage device for storage of materials other than said disc-shaped media.

25. A packaging device comprising:

a container comprising a first complementary member and a second complementary member, said first complementary member including a cavity having an opening therein for receiving at least one disc-shaped media having an aperture therethrough, wherein said first and second complimentary members are adapted to nest within each other such that said cavity is sealed when said second complementary member is nested within said first complementary member, and wherein said first complementary member and said second complementary member cooperate to receive and retain said disc-shaped media within said cavity against linear movement in a direction parallel to the plane of said disc-shaped media, while simultaneously allowing said disc-shaped media to rotate freely; and means for attaching said container to a storage device for storage of materials other than said disc-shaped media.

26. The device of claim 25, wherein said first complementary and said secondary complementary members include corresponding interlocking means.

27. A packaging device comprising:

a container comprising a first member and a second member complementary to said first member, said first member and said second member being attached by a flexible hinge such that said first member and said second member cooperate to create a sealed cavity for receiving at least one disc-shaped media having an aperture therethrough when said first and second members are in a biased together in a closed position, and wherein said first member and said second member further cooperate to receive and retain said disc-shaped media within said cavity against linear movement in a direction parallel to the plane of said disc-shaped media, while simultaneously allowing said disc-shaped media to rotate freely; and means for attaching said container to a storage device for storage of materials other than said disc-shaped media.

28. The device of claim 27, wherein said complementary first and second members further include interlocking closure means to retain said members in said closed position.

29. A method for packaging disc-shaped media together with materials other than said disc-shaped media, said materials being stored in a storage device, said method comprising the steps of:

providing a device for packaging said at least one disc-shaped media comprising:
a container including a cavity having an opening therein for receiving at least one disc-shaped media having an aperture therethrough, said container including means for maintaining said disc-shaped media in a stable state and means for retaining said disc-shaped media against movement within said cavity while simultaneously allowing said disc-shaped media to rotate freely;
means for sealing said cavity; and
means for attaching said container to said storage device for storage of said materials other than said disc-shaped media;

inserting said disc-shaped media into said cavity of said container about said means for maintaining and said means for retaining;

sealing said cavity; and removably attaching said container to said storage device.

30. A method for packaging disc-shaped media together with materials other than said disc-shaped media, said materials being stored device, said method comprising the steps of:

providing a device for packaging said at least one disc-shaped media comprising:
a first complementary member and a second complementary member, said first complementary member including a cavity having an opening therein for receiving at least one disc-shaped media having an aperture therethrough, wherein said first and second complementary members are adapted to nest within each other such that said cavity is sealed when said second complementary member is nested within said first complementary member, and wherein said first complementary member and said second complementary member cooperate to receive and retain said disc-shaped media within said cavity against linear movement in a direction parallel to the plane of said disc-shaped media, while simultaneously allowing said disc-shaped media to rotate freely;
means for attaching said container to said storage device for storage of said materials other than said disc-shaped media;

inserting said disc-shaped media into said cavity;

nesting said second complementary member within said first complementary member; and removably attaching said container to said storage device.

31. A method for packaging disc-shaped media together with materials other than said disc-shaped media, said materials being stored in a storage device, said method comprising the steps of:

providing a device for packaging said at least one disc-shaped media comprising:
a first member and a second member complementary to said first member, said first member and said second member being attached by a flexible hinge such that said first member and said second member cooperate to create a sealed cavity when said first and second members are in a biased together in a closed position, and wherein said first member and said second member further cooperate to receive and retain said disc-shaped media within said cavity against linear movement in a direction parallel to the plane of said disc-shaped media, while simultaneously allowing said disc-shaped media to rotate freely;
means for attaching said container to said storage device for storage of said materials other than said disc-shaped media;

inserting said disc-shaped media into said cavity;

biasing said first member and said second member into a closed position; and removably attaching said container to said storage device.

* * * * *